Jan. 6, 1959  B. F. ELLIS  2,867,069
POWER MOWER WITH ENDLESS BELT CUTTING MEANS
Filed June 28, 1957  3 Sheets-Sheet 1
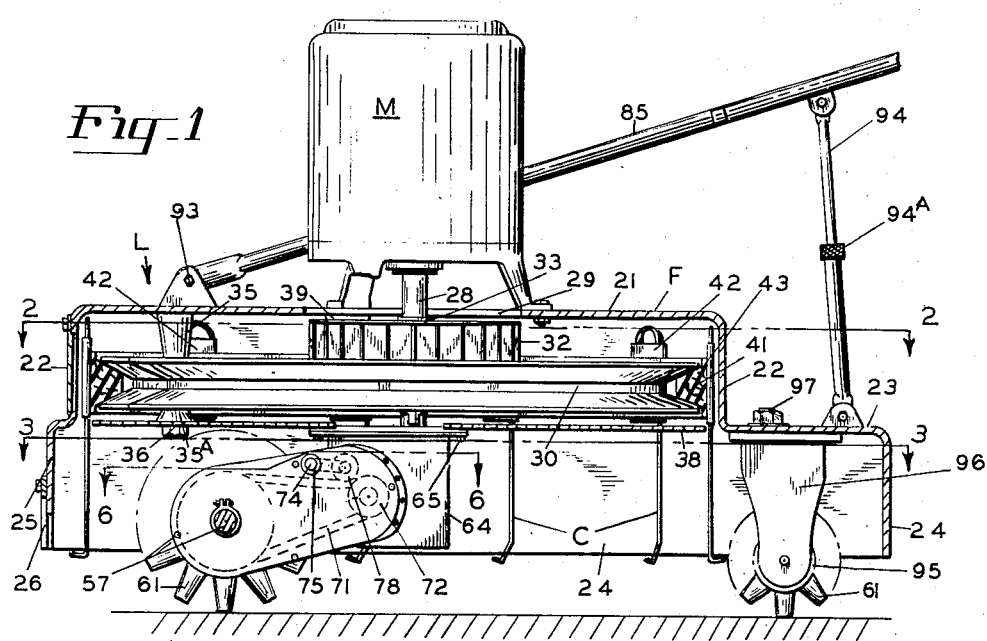
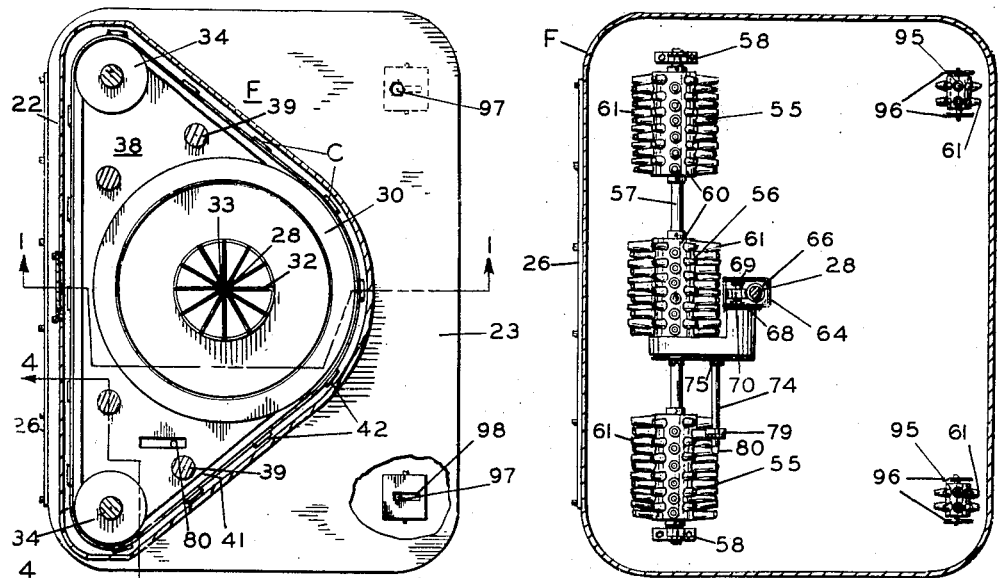
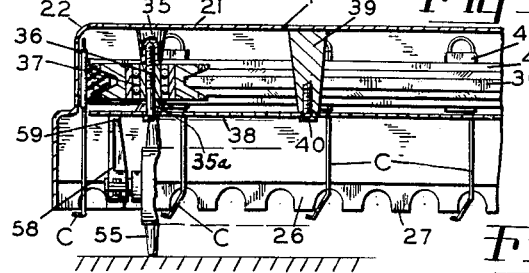
INVENTOR.
BENJAMIN F. ELLIS
BY
Kimmel & Crowell

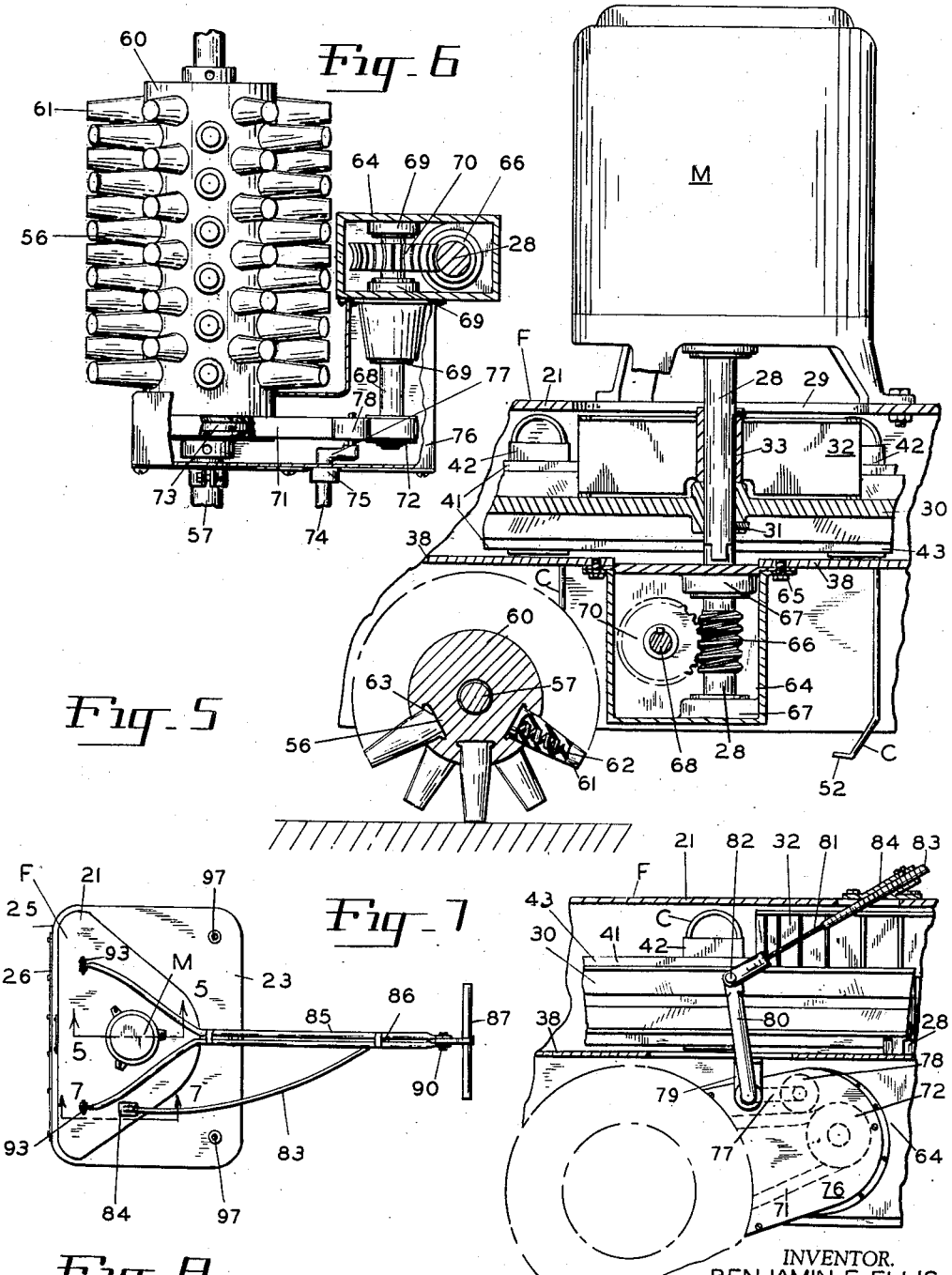

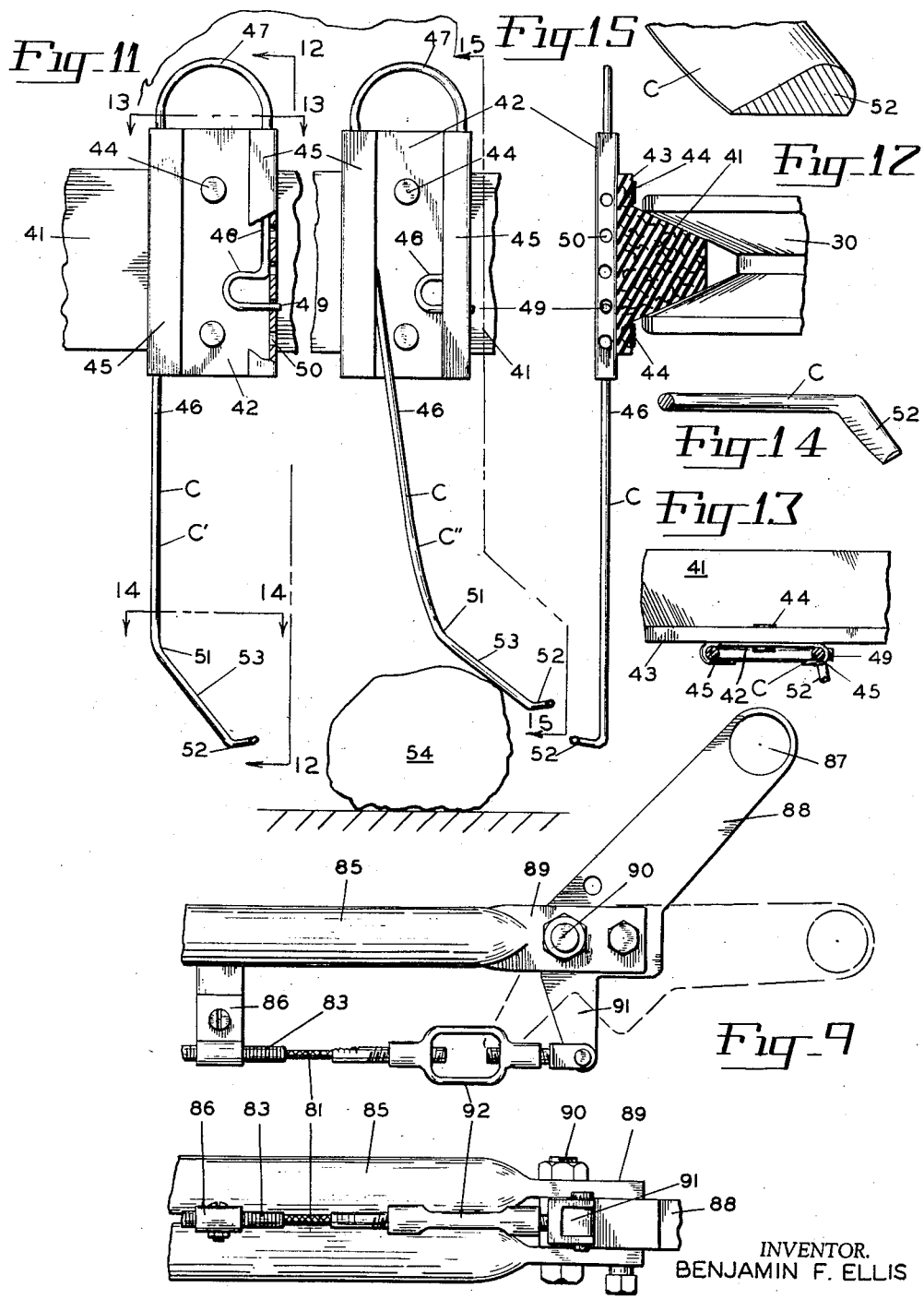

2,867,069
POWER MOWER WITH ENDLESS BELT CUTTING MEANS

Benjamin F. Ellis, Portland, Oreg.

Application June 28, 1957, Serial No. 668,737

2 Claims. (Cl. 56—25)

The present invention relates to lawn mowers and particularly to lawn mowers of the rotary and/or endless belt type.

The primary object of the invention is to provide in a lawn mower an endless belt upon which are secured resilient cutter elements which are deflected away from obstructions.

Another object of the invention is to provide a lawn mower having supporting wheels or rollers such as to support the machine without interfering with the vertical stand of grass being cut.

A further object of this invention is to provide a lawn mower having motive power controlled by the normal operation of the mower directly from the handle bars eliminating all auxiliary levers other than the handle bars themselves.

A still further object of this invention is to provide a lawn mower of the class described above having a caster wheel, for supporting the rear of the mower which does not at any time completely revolve about its vertical axis, but trails in the proper manner behind the vertical support.

Other objects and advantages will become apparent from the following specification when considered in the light of the attached drawings, in which:

Figure 1 is an enlarged vertical sectional view of the device, taken on line 1—1 of Figure 2 looking in the direction indicated.

Figure 2 is a horizontal sectional view of the device, with parts broken away, taken on line 2—2 of Figure 1 looking in the direction indicated.

Figure 3 is a horizontal sectional view, taken on line 3—3 of Figure 1, looking in the direction indicated.

Figure 4 is an enlarged fragmentary vertical sectional view, taken on line 4—4 of Figure 2, looking in the direction indicated.

Figure 5 is an enlarged fragmentary vertical sectional view, taken on line 5—5 of Figure 8, looking in the direction indicated.

Figure 6 is a horizontal fragmentary enlarged sectional view, taken on line 6—6 of Figure 1, looking in the direction indicated.

Figure 7 is an enlarged fragmentary vertical sectional view, taken on line 7—7 of Figure 8, looking in the direction indicated.

Figure 8 is a plan view of the invention.

Figure 9 is an enlarged fragmentary side elevation of the handle bar assembly and clutch control mechanism.

Figure 10 is a bottom plan view of the mechanism shown in Figure 9.

Figure 11 is an enlarged front elevation of a fragmentary portion of the driving belt shown partly broken away and in section.

Figure 12 is a vertical sectional view, taken on line 12—12 of Figure 11, looking in the direction of the arrows.

Figure 13 is a fragmentary horizontal sectional view, taken on line 13—13 of Figure 11, looking in the direction indicated.

Figure 14 is an enlarged horizontal sectional view, taken on line 14—14 of Figure 11 looking in the direction indicated.

Figure 15 is a fragmentary sectional view, taken on line 15—15 of Figure 11, looking in the direction indicated.

Referring now to the drawings in detail wherein like reference characters indicate like parts throughout the several figures, the reference character L indicates generally a lawn mower constructed in accordance with the invention.

The lawn mower L includes a box-like housing framework F, having a top 21 carrying depending vertical side walls 22. A horizontal portion 23 extends outwardly from the side walls 22 carrying a still further vertical side wall 24 partially therearound and a forward side wall 25 the remainder of the way around. The forward side wall 25 is shorter than the side wall 24 and has a special guard 26 adjustably secured to the lower end thereof. The lower edge of the guard 26 is provided with downwardly extending fingers 27 for permitting grass to pass therethrough.

Mounted upon the top 21 of the housing F is a motor M. A motor shaft 28 extends downwardly through an opening 29 in the top 21 and has a driving belt sheave 30 fixedly secured thereto by a set screw 31. A radial type fan 32 has a hub 33 fixedly secured to the shaft 28 by any suitable means. The purpose of the fan 32 is to draw air through the opening 29 of the top 21 of the housing F, distributing the same throughout the interior of the housing F, blowing grass and other matter out from underneath the side walls 24, 25 of the housing F.

Idler sheaves 34 are supported on downwardly extending bosses 35 forming part of the top 21 of the housing F and by upwardly extending bosses 35a forming part of the deck 38. A stud bolt 36 is threaded into the bosses 35, 35a and has a bearing 37 fixedly secured thereto. The stud bolts 36 also support the intermediate deck 38, which keeps grass and the like from getting thereabove. Supporting bosses 39 depend from the top 21 to support the deck 38 secured thereto by cap screws 40. An endless belt 41 is trained about the driving sheave 30 and about the idler sheaves 34, referring particularly to Figures 1, 2 and 4.

Referring now to Figures 11, 12 and 13, the mounting of cutter elements C on the belt 41 is illustrated. Metallic clips 42 are riveted to opposed flanges 43 on belt 41 by rivets 44. The clips 42 have reverse bends 45 formed on their vertical edges which form channels to receive a spring wire 46. The wire 46 extends up through the return bend 45 and has a reverse bend 47 terminating in a hook portion 48. The tip 49 of the hook 48 extends through openings 50 formed in the reverse bend 45.

The cutter element C as shown has a bend at 51, which may be omitted but in any event terminates in a cutter blade 52, which is approximately formed perpendicularly to lower end 53 of the cutting element C. Figures 14 and 15 illustrate the design of the cutter 52.

Referring to Figure 11, one cutter C' is shown in normal grass cutting position, while the next cutter C" has contacted an obstruction 54, demonstrating how the flexibility of the cutter unit C meets and rides over obstructions without damage to the cutter blade 52. This principle carries out one of the primary objects of this invention, that is to prevent breakage of cutter teeth upon striking an obstruction.

The lawn mower L is suported on rollers 55, 56 journalled to a cross shaft 57 clamped within brackets 58 secured to the under side of the deck 38 at 59. Referring particularly to Figures 3, 4, 5 and 6, the supporting rollers 55 and 56 consist of hubs 60 having radial resilient fingers 61 mounted therein. The fingers 61 may have reenforcing stiffeners 62 molded therein if desired and are held within the hub 60 by flanges 63. Referring to Figure 5, the fingers 61 pass down through the blades of grass to the ground to support the mower L eliminating the packing or bending down of the grass such as to prevent the same from being cut.

The roller 56 is driven by a motor M through a gear box 64 fixedly mounted to the intermediate deck 38 at 65. Located within the gear box 64 is a worm 66 journalled within bearings 67. A cross shaft 68 is journalled within bearings 69 and has a worm wheel 70 keyed thereto driven by the worm 66. A belt 71 is trained about a sheave 72 on the shaft 68 and engages within a groove 73 formed on the hub 60 of the driven roller 56.

A belt tightener, referring to Figures 1, 3, 6 and 7, consisting of cross shaft 74 journalled within bearing 75 forming part of the housing 76, has a crank 77 forming part thereof and a tightener roller 78 journalled thereto engaging the belt 71. The opposite end of the shaft 74 is journalled within bearing bracket 79 and has an upstanding crank 80 formed thereon. Operating control cable 81 is pivotally connected to the crank 80 at 82. The cable 81 passes through a flexible conduit 83 fixedly secured by clamp 84 to the top 21 of the housing F.

Referring to Figures 7, 8, 9 and 10, the opposite end of the flexible conduit 83 is clamped to a handle 85 by a clamp 86. Handle bars 87 form part of lever 88 pivotally connected to the end 89 of the handle 85 by a pivot bolt 90. The control cable 81 is connected to a lever 91, forming part of the lever 88, by an adjustable turn-buckle 92 to provide for adjusting the length of the control cable 81.

When the handle bars 87 and the lever 88 are in the position shown in Figures 9 and 10, the control cable 81 will have been pulled to apply pressure on the tightner roller 78 and thus against the belt 71 causing the shaft 68 to drive the roller 56 for moving the lawn mower L over the ground surface. When the handle bars 87 and the lever 88 are brought to the broken line position, Figure 9, the tightner roller 78 will be released from the belt 71, permitting the sheave 72 to revolve freely within the belt 71 causing the mower L to stand still.

From this construction, it can be readily seen that the operator need not remove his hands from the handle bars 87 to control movement of the lawn mower L. The handle 85 is pivotally connected to the frame F at 93 and is held in the desired position by a telescopical support 94. When it is desired to lock the sections of the support 94 in a fixed position, a jam nut 94a is tightened. The support 94 can telescope freely when the nut 94a is loose, allowing freedom of action of the handle 85 in regards to the mower L.

Referring to Figures 1, 2 and 3, supporting rollers 95 are journalled within yokes 96. The rollers 95 also have fingers 61 formed thereon to pass on down through the grass without rolling the same flat. The yokes are pivotally mounted on a vertical threaded stem 97. A slot 98 is formed on the top surface of the yoke 96 and permits the yoke 96 to shift longitudinally in either direction that the lawn mower L may be travelling. The slot 98 permits the yoke 96 to move enough to bring the center line of the supporting roller 95 behind the vertical axis of the stem 97 so that the roller 95 will trail behind the vertical center line of the stem 97 and will not have to turn completely around on making a turn as does a caster wheel type support. This gives a freedom of movement in guiding the lawn mower L over the ground surface.

In the use and operation of the mower L motor M drives the driving sheave 30 mounted on the motor shaft 28. The sheave 30 will move the belt 41, including the cutter elements C across the front of the mower L, cutting the grass entering under and through the fingers 27 of the guard 26. At the same time the shaft 28 will drive the worm 66, the worm wheel 70 and finally the sheave 72, so that by simply pushing upward on the handle bars 87 and the lever 88, the cable 81 will pull the tightner roller 78 down against the belt 71 causing the same to grip the driving sheave 72, to rotate the driven roller 56, moving the lawn mower L over the ground surface.

It should be noted that the drive of the belt 41 and cutters C is continuous when the motor M is operating so that the ground speed of the mower L may be slowed through the cable 81 without slowing the cutting speed of the cutters C.

Having thus described the preferred embodiments of the invention it should be understood that numerous structural modifications and adaptations may be resorted to without departing from the scope of the appended claims.

What is claimed is:

1. A lawn mower comprising a housing, rotatable means supporting said housing for movement, a motor supported on said housing, a drive sheave positioned within said housing supported and driven by said motor, a pair of spaced apart idler sheaves journalled in said housing in horizontally aligned relation with respect to said drive sheave, an endless belt trained about said idler sheaves and said drive sheave for movement thereabout on rotation of said drive sheave, a plurality of clips secured in vertically extending longitudinally spaced relation to said belt, said clips having an inwardly opening vertical channel integrally formed on each side edge of each clip, one of said channels on each clip having a plurality of vertically spaced openings formed therein, an inverted U-shaped resilient wire member engaged in the channels of each clip, a hook integrally formed on one end of said member selectively engaged in one of said openings, said member having the other end thereof substantially elongated and depending from said clip, and a horizontally offset cutter blade integrally formed on the terminus of said other end, said resilient wire member permitting displacement of said cutter blade from its position generally underlying said clip.

2. A device as claimed in claim 1 wherein said substantially elongated other end of said wire member is angularly offset downwardly in a direction toward the axis of said one end.

References Cited in the file of this patent
UNITED STATES PATENTS

| | | |
|---|---|---|
| 463,229 | Hiestand | Nov. 17, 1891 |
| 1,839,396 | Kimball | Jan. 5, 1932 |
| 2,468,399 | Grossman | Apr. 26, 1949 |
| 2,728,181 | Carpenter | Dec. 27, 1955 |
| 2,744,376 | Miner | May 8, 1956 |
| 2,782,582 | McClearen | Feb. 26, 1957 |